(12) United States Patent
Perret et al.

(10) Patent No.: US 11,712,841 B2
(45) Date of Patent: Aug. 1, 2023

(54) DRY BEAM PATH

(71) Applicant: EOS GmbH Electro Optical Systems, Krailling (DE)

(72) Inventors: Hans Perret, Munich (DE); Stefan Paternoster, Andechs (DE)

(73) Assignee: EOS GmbH Electro Optical Systems, Krailling (DE)

( * ) Notice: Subject to any disclaimer, the term of this patent is extended or adjusted under 35 U.S.C. 154(b) by 27 days.

(21) Appl. No.: 17/028,246

(22) Filed: Sep. 22, 2020

(65) Prior Publication Data

US 2021/0122106 A1 Apr. 29, 2021

(30) Foreign Application Priority Data

Oct. 28, 2019 (DE) .......................... 102019216570.2

(51) Int. Cl.

| | |
|---|---|
| *B29C 64/153* | (2017.01) |
| *B29C 64/364* | (2017.01) |
| *B29C 64/393* | (2017.01) |
| *B29C 64/286* | (2017.01) |
| *B29C 64/268* | (2017.01) |
| *B29C 64/25* | (2017.01) |
| *B33Y 10/00* | (2015.01) |

(Continued)

(52) U.S. Cl.
CPC ............ *B29C 64/153* (2017.08); *B29C 64/25* (2017.08); *B29C 64/268* (2017.08); *B29C 64/286* (2017.08); *B29C 64/364* (2017.08); *B29C 64/393* (2017.08); *B33Y 10/00* (2014.12); *B33Y 30/00* (2014.12); *B33Y 50/02* (2014.12)

(58) Field of Classification Search
CPC ......... B29C 64/00; G02B 26/00; B33Y 10/00; B33Y 30/00; B33Y 70/10; B28B 1/001; B22F 10/00; B22F 12/00
See application file for complete search history.

(56) References Cited

U.S. PATENT DOCUMENTS

| | | |
|---|---|---|
| 2010/0044922 A1 | 2/2010 | Higashi et al. |
| 2016/0059310 A1 | 3/2016 | Junker et al. |
| | (Continued) | |

FOREIGN PATENT DOCUMENTS

| | | |
|---|---|---|
| DE | 202009018133 | 3/2011 |
| DE | 102018202644 | 8/2019 |

OTHER PUBLICATIONS

John Wallace, Medical Lasers: Carbon monoxide laser shows surgical potential, Aug. 11, 2017, Laser Focus World, p. 2 (Year: 2017).*

*Primary Examiner* — Leith S Shafi
*Assistant Examiner* — Tiffany Yu Huang
(74) *Attorney, Agent, or Firm* — Seyfarth Shaw LLP (57) ABSTRACT

An additive manufacturing method including repeatedly applying a layer of building material on a previously selectively solidified building material layer and scanning the layer at positions corresponding to the cross-section of the object in this layer, where the laser radiation is generated by a laser light source and is directed onto the building material layer via optical components. An optics compartment is encased by an optics compartment housing and accommodates the optical components. A defined gas atmosphere is maintained inside of the optics compartment, wherein the relative humidity of the defined gas atmosphere is kept below 3%.

19 Claims, 5 Drawing Sheets

(51) Int. Cl.
*B33Y 30/00* (2015.01)
*B33Y 50/02* (2015.01)

(56) References Cited

U.S. PATENT DOCUMENTS

| | | |
|---|---|---|
| 2018/0001553 A1 | 1/2018 | Buller et al. |
| 2018/0025797 A1* | 1/2018 | Van Rooyen .......... B33Y 70/00 376/416 |
| 2018/0079029 A1 | 3/2018 | Scott et al. |
| 2018/0126650 A1* | 5/2018 | Murphree ............... B22F 10/20 |
| 2018/0186081 A1* | 7/2018 | Milshtein ............. B23K 26/062 |
| 2019/0232429 A1* | 8/2019 | Buller ................. B23K 26/123 |

\* cited by examiner

DRY BEAM PATH

TECHNICAL FIELD OF THE INVENTION

The present invention refers to an additive manufacturing apparatus and a related additive manufacturing method.

BACKGROUND OF THE INVENTION

Additive manufacturing apparatuses and related methods (also referred to as "additive manufacturing") are generally characterized by the fact that objects are manufactured in them layer by layer by solidifying a shapeless building material. The solidification can be effected, for example, by supplying thermal energy to the building material by irradiating it with electromagnetic radiation or particle radiation (e.g. laser sintering or laser melting or electron beam melting). In laser sintering or laser melting, for example, the area of incidence of a laser beam on a layer of the building material is moved across those positions of the layer which correspond to the object cross-section of the object to be produced in this layer.

Having been initially conceived for the manufacturing of prototypes, the mentioned apparatuses and methods meanwhile are also used for producing larger numbers of pieces. This makes a quick servicing of the equipment that is used more and more important. However, the demands on precision, meaning resolution of details, at the same time are also increasing. If laser radiation is used for melting a building material in powder form, this means that the demands on the optics for focusing and guiding the laser beam will also constantly grow.

SUMMARY OF THE INVENTION

Therefore, the object of the present invention is to provide an additive manufacturing apparatus and an additive manufacturing method by means of which the series production of parts with high precision becomes possible.

The object is achieved by an additive manufacturing method according to claim 1 and an additive manufacturing apparatus according to claim 9. Further developments of the invention are claimed in the dependent claims. In particular, a device according to the invention may also be developed further by features of the methods according to the invention as set out below or in the dependent claims and vice versa. Furthermore, the features described in connection with one device can also be used for the further development of another device according to the invention, even if this is not explicitly stated.

An inventive additive manufacturing method for manufacturing a three-dimensional object in an additive manufacturing apparatus by a layer-wise selective solidification of building material by means of an irradiation with laser radiation, wherein:

in a process chamber repeatedly a layer of building material is applied on a previously selectively solidified building material layer and is scanned with laser radiation at positions corresponding to the cross-section of the object in this layer, the laser radiation is generated by means of a laser light source and is directed onto the building material layer via a number of optical components, wherein an optics compartment that is encased by an optics compartment housing accommodates the optical components, is characterized in that a defined gas atmosphere is maintained inside of the optics compartment, wherein the relative humidity of the defined gas atmosphere is kept below 3%.

The present invention is related to additive manufacturing apparatuses and methods in which energy is selectively supplied to a layer of the building material as electromagnetic radiation. The working plane (also referred to as construction plane) is a plane in which the top surface of the layer is located to which the energy is supplied. Usually this is the top-most layer of the layer stack that is produced in the layer-wise manufacture. Here, the energy input unit comprises a laser. The invention refers in particular to laser sintering or laser melting, wherein heat is supplied to the building material by means of radiation so that the same melts and after a cooling-down exists in a solid and no longer shape-less state, meaning it has been solidified.

Here, it should also be remarked that by means of an additive manufacturing apparatus according to the invention not only one object, but also several objects can be manufactured at the same time. If in the present application the manufacturing of an object is mentioned, then it goes without saying that the corresponding description is applicable in the same way also to additive manufacturing methods and apparatuses in which several objects are manufactured at the same time.

The optical components by means of which the laser radiation is directed to the construction plane are sensitive to vapors, contaminations or temperatures occurring in the manufacture. Therefore, these optical components, also referred to as optics section, preferably are accommodated in a room that is separated from the process chamber—the optics compartment—which is preferably hermetically separated from the process chamber. In principle, the optics compartment may comprise all optical components between the exit of a laser source and the beam entrance window through which the radiation enters the process chamber. Nevertheless, the inventive idea may be advantageously applied even if only a part of the optical components is surrounded by a defined gas atmosphere having a relative humidity that is limited in accordance with the invention.

For the case that in an additive manufacturing process in an additive manufacturing apparatus two or more laser beams (ray bundles) can be simultaneously directed to the working plane, for each beam path the optical components commonly assigned thereto can be accommodated in their own optics compartment with optics compartment housing. For example, for each laser beam (ray bundle) there may exist an optics compartment that is separated from the optics compartments assigned to the other laser beams (ray bundles) such that in the different optics compartments different gas atmospheres can be maintained. On the one hand, this arrangement can be used when the radiation emitted by a laser source is split into two or more beam paths. On the other hand, to each beam (ray bundle) that is directed onto the working plane its own laser source can be assigned. In particular in the latter case, it is possible to intentionally maintain different gas atmospheres in the different optics compartments for the case that the different laser sources do emit laser light of different wavelengths. In this way, in each optics compartment a gas atmosphere can be chosen, for which there is as few absorption as possible of the wavelengths of the assigned laser radiation. In particular, in the different optics compartments also different values for the relative humidity can be set.

When an optics compartment housing is configured for maintaining a defined gas atmosphere, this means that inside of the optics compartment housing a gas atmosphere can be maintained, which is different from an atmosphere surrounding the additive manufacturing apparatus. The difference may e.g. be due to the gas composition and/or to the gas pressure.

Though it is quite conceivable to work with a gas that is stationary in the optics compartment, it is nevertheless much easier to establish the desired gas atmosphere in the optics compartment by passing a gas stream or gas flow through the optics compartment. The additive manufacturing apparatus may be provided with a gas inlet and outlet for this purpose. When the gas inlet is connected to a source of gas existing at the installation site of the additive manufacturing apparatus (e.g. to an existing nitrogen gas connection or possibly to a gas bottle), a gas stream or gas flow though the optics compartment is provided resulting from a pressure difference between the gas inlet and outlet. Optionally, the additive manufacturing apparatus comprises a gas circulation unit, in particular a drive means for moving a volume of gas, thus, e.g. a pump or a fan.

It shall be mentioned that when there exist several optics compartments, on the one hand the additive manufacturing apparatus can have several gas inlets and outlets in order to be able to provide different gas atmospheres for different optics compartments. On the other hand, when there exists only one gas inlet, the gas stream can be distributed among different optics compartments after the gas inlet, for example by means of a branching. Here, one should take care that the respective tolerance ranges for the volume flow rate of the gas in the individual optics compartments are observed, e.g. by the use of throttle valves and flow meters. A joining of the gas streams exiting the optics compartments in order to route them to a common gas outlet can also be implemented, e.g. by means of a branching.

For establishing the defined gas atmosphere, it is possible to use for example nitrogen, pressurized air or argon. In particular, gas mixtures may also be used.

The relative humidity of the defined gas atmosphere designates the percentage ratio of the current vapor pressure of water to the equilibrium vapor pressure of the same under standard conditions for temperature and pressure, meaning a temperature of 273.15° K and a pressure of 101.325 kPa in accordance with DIN 1343.

The inventors have found that when the requirements for the precision of the manufactured objects are increasing, also the interaction of the laser radiation with the medium penetrated by it has to be taken into consideration. This interaction particularly plays a role when the laser radiation traverses a gaseous medium on its way from the laser light source to the construction plane. Particularly for the lasers used for the solidification of polymer-based building material, an interaction of the radiation of these lasers with water vapor in the air has to be taken into consideration. Therefore, according to the invention, at least during the additive manufacturing process in the additive manufacturing apparatus, meaning while laser radiation is directed to the building material, the relative humidity of the gas atmosphere that is penetrated by the laser light is set to a value below 3%.

Of course, the extent of adverse effects on the laser radiation when it penetrates a gas atmosphere containing water vapor depends on the optical path length. The mentioned maximum value of 3% for the relative humidity yields for satisfying results in situations in which the optical path of the laser radiation in the gas atmosphere in the optics compartment does not exceed 0.5 m. It is possible that for longer optical paths (e.g. 1 m) only a maximum value of 2% can be tolerated. In the same way it can be necessary to limit the maximum value to 1.5% for even longer optical paths (e.g. 1.5 m).

Particularly in those additive manufacturing apparatuses in which a gas laser is used, it may be difficult in practice to implement small optical path lengths. Therefore, particularly for this application area, the inventive control of the maximum relative humidity in the optics compartment is important.

On the other hand, the lower the admissible maximum value for the relative humidity, the higher the precision that can be obtained. Accordingly, it all in all results that the relative humidity of the defined gas atmosphere should at all events be kept below 3%, preferably below 2.5%, more preferably below 2%, even more preferably below 1.5%, even more preferably below 1% and most preferably below 0.5%.

The mentioned values for the length of the beam path and for the relative humidity do particularly apply for a wavelength of the laser light of 5.5 μm, for which the absorption spectrum of water has a maximum. For other wavelengths the absorption by water, which strongly depends on the wavelength, will be smaller, so that rather the higher ones of the mentioned maximum values for the relative humidity can be applied.

To begin with, a humidity control can be implemented by arranging a drying unit in the optics compartment, which drying unit is configured such that it lowers the relative humidity of the gas atmosphere to the desired value. All devices that are known in the prior art for this purpose are suitable as drying unit, e.g. a condensation dryer, an adsorption dryer, a Peltier dryer or a granulate dryer in which a drying medium (e.g. zeolite) is used.

Alternatively, it is possible to already set the relative humidity of the gas supplied to the optics compartment for providing the defined gas atmosphere to a value below the value of the gas atmosphere in the optics compartment. For example, a percentage of a dry gas in the gas stream supplied to the optics compartment may be increased.

Preferably, the relative humidity of the defined gas atmosphere within the optics compartment housing is kept below 1%. A value of the relative humidity of 1% corresponds to a dew point of −37° C. or to a value for the absolute humidity of 0.18 g/m$^3$ or to a water content (ratio of water vapor in the defined gas atmosphere, meaning the mass ratio of water vapor and dry gas which is also referred to as mixing ratio) of 153 ppm.

The lowering of the relative humidity to such a low value can be of considerable use for manufacturing processes in which a precision that is as high as possible is essential. The same applies to situations in which the path of the laser radiation in the gas atmosphere in the optics compartment is long (e.g. 2 m or more). In particular, for some applications it may be necessary to limit the relative humidity to a value of 0.5%, of 0.3% or even 0.1%.

Further preferably, a defined process chamber gas atmosphere is maintained in the process chamber (3) and the relative humidity of the process chamber gas atmosphere is kept below 3%. The gas atmosphere in the process chamber can be identical to the one in the optics compartment housing or else can be different from it, e.g. concerning the gas composition and/or the gas pressure. It is of particular importance that the relative humidity of the gas atmosphere in the process chamber is limited as in that way the laser radiation is not excessively absorbed or diffracted also on its way to the construction plane. Preferably, the admissible maximum value for the relative humidity of the gas atmosphere in the process chamber should be chosen to be the same as the one for the gas atmosphere in the optics compartment. This applies in particular when the gas atmospheres in the optics compartment and in the process chamber are not separated from each other.

Further preferably, when determining the values of the relative humidity in the optics compartment and in the process chamber that shall not be exceeded, the respective lengths of the beam paths are taken into consideration, which may result in the determination of different maximum values. For example, in the case of a longer beam path in the process chamber, a lower maximum value of the relative humidity in the process chamber can be specified. Moreover, in those cases, in which due to the process, e.g. due to the humidity of the powder, more humidity gets into the process chamber, the specification of a higher maximum value in the process chamber may be appropriate. All possibilities for a design of the humidity control for the optics compartment that are mentioned further above and further below, do in the same way apply to the process chamber. The same applies for the way in which the defined gas atmosphere is established in the process chamber.

The remarks with respect to the length of the path of the laser radiation through the gas atmosphere, which were made further above in relation to the optics compartment, do apply in the same way also to the process chamber. Also here it holds that for small path lengths of the radiation in the process chamber higher values of the relative humidity can be tolerated. However, the optical path length for the radiation in additive manufacturing apparatuses cannot be made arbitrarily small as due to the type of construction there are limitations. If in particular the laser beam is deflected by means of a scanner in order to scan the building material with a laser beam, the radiation should be incident on the building material with an angle as high as possible or as perpendicular as possible. However, for a region to be scanned having a usual size, this can only be implemented when the distance of the scanner from the construction plane and thus the path length of the radiation is sufficiently large.

It is advantageous to use an existing humidity control unit of the optics compartment also for the process chamber and to additionally supply the gas supplied to the optics compartment for establishing the gas atmosphere also to the process chamber instead of using two independent systems for the humidity control and the provision of the gas atmosphere in the optics compartment and in the process chamber. This can be implemented by supplying to the process chamber a gas having the same composition as the one that is supplied to the optics compartment via a separate gas inlet at the process chamber (in particular in its wall). In other words, a gas mixture having the same gas percentages of pure gases is supplied to the process chamber. Optionally, one can do without a separate gas inlet at the process chamber and instead can provide a gas permeable link (meaning a passage or a pipe) in a common wall between the optics compartment and the process chamber.

Further preferably, from the exit of the laser light source to a beam entrance window through which the radiation enters the process chamber, the laser radiation is led inside of the defined gas atmosphere along its entire beam path outside of optical components. Thereby, an adverse effect on the laser radiation by a water vapor-containing gas atmosphere can be avoided to a still larger extent.

Further preferably, the relative humidity of the defined gas atmosphere is feedback-controlled using at least one measurement value characterizing the relative humidity of the defined gas atmosphere, which is output by at least one humidity sensor arranged in the optics compartment, for feedback-controlling the relative humidity of the defined gas atmosphere. Due to the use of a humidity sensor, the actual relative humidity in the gas atmosphere can be checked. As variations of the gas composition may occur depending on the properties of the gas stream inside of the room through which the gas flows, it is advantageous to arrange a plurality of humidity sensors at different positions in the room through which the gas flows.

In particular when a feedback is used by accessing the measurement values that are output by the at least one humidity sensor, which measurement values characterize the relative humidity of the gas atmosphere, the relative humidity can be adjusted, i.e. feedback-controlled in a particularly precise way. Here, for a plurality of humidity sensors there are different possibilities for a feedback control. For example, the feedback control may be based on the arithmetic mean of the measurement values outputted by the sensors or else the feedback control is based on the maximum value of the measurement values outputted by the plurality of humidity sensors. Furthermore, it is also possible to allocate weighting factors to the measurement values, which weighting factors are chosen depending on the position of the respective humidity sensor.

For the case that a plurality of optics compartments exists, it is possible to provide each of the optics compartments with at least one humidity sensor. The relative humidity in the individual optics compartments then can be individually adjusted based on the sensor values outputted for an optics compartment. If the optics compartments are connected to a common gas inlet, between each of the optics compartments and the gas inlet a gas flow rate regulation device and/or a unit that increases the ratio of a dry gas in the gas stream supplied to the optics compartment can be respectively arranged.

Further preferably, the defined gas atmosphere in the optics compartment is maintained by supplying a gas with a volume flow rate that is larger than or equal to 2 l/min and/or smaller than or equal to 15 l/min, preferably 10 l/min. Preferably, the supplied gas stream is chosen such that in the optics compartment and the process chamber, as the case may be, there exists an excess pressure with respect to the surrounding atmosphere, preferably a pressure difference of at least 50 Pa with respect to the surrounding atmosphere. In this way, a contamination with water vapor from the surrounding atmosphere can be prevented in a particularly effective way.

Further preferably, the defined gas atmosphere in the optics compartment is established by flooding the optics compartment with a volume flow rate that is larger than 50 l/min, preferably larger than 80 l/min, and/or smaller than 120 l/min, preferably smaller than 150 l/min. By a flooding of the optics compartment, after a service the optics compartment can quickly be refilled with the gas used during the operation of the additive manufacturing apparatus in order to loose as little time as possible and be able to quickly continue or newly start a manufacturing process. Particularly for a series production, this is of importance.

Further preferably, a plastic-based powder is used as building material. Preferably, the powder used as building material is a plastic-based (polymer-based) powder or gel that is characterized by a ratio of at least 50 weight-% of a polymer. Here, in particular polyaryletherketones, polyarylethersulfones, polyamides, polyesters, polyethers, polyolefines, polystyrenes, polyphenylensulfides, polyvinylidenfluorides, polyphenylenoxides, polyimides, their copolymers and blends comprising at least one of the aforementioned polymers, wherein the selection is however not limited to the above mentioned polymers and copolymers are possible as polymers. Particularly suitable polyaryletherketones can be selected from the group consisting of polyetheretherketone (PEEK), polyetherketoneketone (PEKK), polyetherketone (PEK), polyetheretherketoneketone (PEEKK), polyetherketoneetherketoneketone (PEKEKK) and polyetheretheretherketone (PEEEK) as well as their copolymers in particular together with polyarylethersulfones as well as their blends comprising at least one of the aforementioned polymers. Particularly suitable polyamide polymers or copolymers and their blends can be selected from the group consisting of polyamide 6/6T, polyamide elastomers like polyetherblockamides such as PEBAX™-based materials, polyamide 6, polyamide 66, polyamide 11, polyamide 12, polyamide 612, polyamide 610, polyamide 1010, polyamide 1212, polyamide PA6T/66, PA4T/46 and copolymers comprising at least one of the aforementioned polymers. Suitable polyesterpolymers or copolymers can be selected from the group consisting of polyalkylene terephthalates (e.g. PET, PBT) and their copolymers. Suitable polyolefine polymers or copolymers can be selected from the group consisting of polyethylene and polypropylene. Suitable polystyrene polymers or copolymers can be selected from the group consisting of syndiotactic and isotactic polystyrenes. Furthermore, polymer composite powders comprising fillers and/or additives besides the corresponding polymer, copolymer or blend can be used. Among these fillers are e.g. fibers such as carbon or glass fibers and carbon nanotubes, fillers having a small aspect ratio such as glass beads or aluminum grit, mineral fillers such as titanium dioxide. Among the additives are i.a. processing aids such as free-flowing agents of the Aerosil series (e.g. Aerosil 200), functional additives such as heat stabilizers, oxidation stabilizers, color pigments (e.g. graphite or carbon black) and flame retardants (e.g. organophosphates, brominated hydrocarbons).

An inventive additive manufacturing apparatus for manufacturing a three-dimensional object by a layer-wise selective solidification of building material by means of an irradiation with laser radiation, comprising:

a process chamber, in which repeatedly a layer of building material can be applied on a previously selectively solidified building material layer and can be scanned with the laser radiation at positions corresponding to the cross-section of the object in this layer, a laser light source for generating the laser radiation, a number of optical components for directing the laser radiation onto the building material layer, wherein the number of optical components is arranged in an optics compartment that is encased by an optics compartment housing, which is configured to maintain a defined gas atmosphere in the optics compartment, characterized by a humidity control unit that keeps the relative humidity of the defined gas atmosphere inside of the optics compartment housing below 3% during the operation of the additive manufacturing apparatus.

The degree of impairment of the laser radiation penetrating a water vapor-containing atmosphere depends of course also on the path length. The mentioned maximum value of 3% for the relative humidity provides satisfactory results for situations in which the optical path of the laser radiation in the gas atmosphere in the optics compartment does not exceed 0.5 m. For longer paths (e.g. 1 m) it may be that only a maximum value of 2% can be tolerated. Also, for even longer paths (e.g. 1.5 m) it can be necessary to limit the maximum value to 1.5%.

Particularly in additive manufacturing apparatuses in which a gas laser is used, it is difficult in practice to implement small path lengths so that in particular in this application area the inventive control of the maximum relative humidity in the optics compartment is important.

On the other hand, the precision that can be obtained is the higher the smaller the admissible maximum value for the relative humidity. All in all it results that the relative humidity of the define gas atmosphere by all means should be kept below 3%, preferably below 2.5%, more preferably below 2%, even more preferably 1.5%, even more preferably below 1% and most preferably below 0.5%.

The specified values for the length of the beam path and for the relative humidity do particularly apply for a wavelength of the laser light of 5.5 µm, for which the absorption spectrum of water has a maximum. For other wavelengths, the absorption by water, which strongly depends on the wavelength, will be smaller, so that rather the higher ones of the mentioned maximum values of the relative humidity can be applied.

To begin with, the humidity control unit can be implemented by arranging a drying unit in the optics compartment, which drying unit is configured such that it lowers the relative humidity of the gas atmosphere to the desired value. All devices that are known in the prior art for this purpose are suitable as drying unit, e.g. a condensation dryer, an adsorption dryer, a Peltier dryer or a granulate dryer in which a drying medium (e.g. zeolite) is used. In this case, the humidity control unit is located in the additive manufacturing apparatus.

Alternatively, it is possible to additionally or alternatively set the relative humidity of the gas supplied to the optics compartment for providing the defined gas atmosphere to a value below 3%. For example, a percentage of a dry gas in the gas stream supplied to the optics compartment can be increased. In this case, the humidity control unit is located outside of the additive manufacturing apparatus.

Furthermore, the humidity control unit may substantially consist of a feedback control component that is part of a control unit controlling the additive manufacturing apparatus or interacts with a sensor component arranged in the additive manufacturing apparatus, in particular in the optics compartment housing, which sensor component communicates to the feedback control component a current value of the relative humidity at at least one position inside of the optics compartment housing.

By the humidity control, the water vapor content of the gas atmosphere which is penetrated by the laser radiation is limited. Therefore, the laser radiation can be directed onto the building material with higher precision and power losses when the gas atmosphere is penetrated are smaller.

Preferably, the optics compartment is separated from the process chamber by a radiation entrance window formed in a common wall between the process chamber and the optics compartment. The laser radiation is directed onto the construction plane through the radiation entrance window which is usually arranged at the top of the process chamber. When the process chamber and the optics compartment housing do immediately adjoin each other, it is possible to ensure that the laser radiation along its entire path to the beam entrance window does only run inside of the defined gas atmosphere having a limited water content. Here, the common wall with the radiation entrance window can be designed to have one layer or also several layers, e.g. two layers with a gap between the layers, in particular also between the windows in the individual layers.

Preferably, the wall of the process chamber is configured such that a defined gas atmosphere can be maintained in the process chamber, wherein the additive manufacturing apparatus comprises a process chamber humidity control unit that keeps the relative humidity of the defined gas atmosphere in the process chamber during the operation of the additive manufacturing apparatus below 3%.

Independent of the presence of a process chamber humidity control unit that keeps the relative humidity of the defined gas atmosphere in the process chamber during the operation of the additive manufacturing apparatus below 3%, the gas stream led through the optics compartment(s) can be supplied to the process chamber after having left the optics compartment. Thereby, the relative humidity of the gas atmosphere can be kept below 3% or below an even smaller value also inside of the process chamber. If an inert gas is used for establishing the dry gas atmosphere in the optics compartment, for such an approach it is also possible to provide at the same time for an inertization of the process chamber.

Further preferably, the laser light source is arranged outside of the optics compartment housing and is connected to the optics compartment housing via a laser beam housing, preferably by means of a hermetical connection, wherein the laser beam housing is configured to maintain a defined gas atmosphere and is designed such that laser radiation can be directed from the laser light source through the laser beam housing into the optics compartment housing. If the laser light source is outside of the optics compartment housing, it is possible to ensure by means of the laser beam housing that the radiation penetrates a gas atmosphere having a limited water content already immediately after having left the laser light source. For this, the laser beam housing is preferably supplied with the same gas atmosphere as the optics compartment, particularly in that both are connected to each other such that gas from the optics compartment may enter the laser beam housing and vice versa, wherein, however, both are hermetically connected to each other meaning are connected to each other such that gas density exists with respect to the surroundings of the laser beam housing and of the optics compartment housing. Then, by means of the humidity control unit, the relative humidity can be kept below 1% also in the laser beam housing.

Further preferably, the additive manufacturing apparatus has a gas connection allowing a supply of gas into the optics compartment during the operation of the additive manufacturing apparatus. The gas connection is preferably arranged at the laser beam housing, particularly preferably near the joint between the laser beam housing and the exit of the laser light source.

When the gas inlet is arranged at the exit of the laser light source, it is possible to provide for a continuous gas stream through the room inside of the laser beam housing and the optics compartment and, as the case may be, also through the process chamber, due to the connection between the laser beam housing and the optics compartment. Thereby, it is possible to provide for a relatively homogenous, dry gas atmosphere in the entire region that is traversed by the laser radiation.

Further preferably, the laser light source (21) is a CO laser. Particularly the light emitted by a CO laser, the wavelengths of which lie in a range around 5.5 µm, is strongly absorbed and diffracted, respectively, by water. Therefore, an application of the invention is particularly suitable in conjunction with CO lasers. As CO lasers emit smaller wavelengths than CO2 lasers, smaller structures can be realized when the building material is exposed using a CO laser. Particularly for this case it is possible to provide for an increased precision in the scanning of the building material by the inventive provision of a dry gas atmosphere.

Further preferably, at least one humidity sensor is arranged in the optics compartment. By the use of a humidity sensor that outputs a measurement value characterizing the water content or the relative humidity of the defined gas atmosphere, the actual relative humidity of the gas atmosphere can be checked. As variations of the gas composition may occur that depend on the properties of the gas stream inside of the room through which the gas streams, an arrangement of several humidity sensors at different positions inside the room through which the gas streams is advantageous. By the use of the measurement values of the relative humidity outputted by the humidity sensor, a humidity control unit which is designed to be a feedback control unit is able to adjust the relative humidity in the optics compartment more precisely.

Further preferably, the additive manufacturing apparatus comprises a flooding device, which when being activated enables a feeding of gas into an optics compartment housing with a volume flow rate that is larger than 50 l/min, preferably larger than 80 l/min, and/or smaller than 120 l/min, preferably smaller than 150 l/min. A flooding unit is in particular a source of gas that allows for a supply of gas with a high volume flow rate (larger than or equal to 50 l/min), for example a gas reservoir outside of the additive manufacturing apparatus having a high differential pressure against the surrounding atmosphere, which gas reservoir is able to supply gas with a corresponding volume flow rate via a valve, or a gas circulation system that is able to provide for the corresponding volume flow rates. Preferably, the flooding unit is arranged at the gas inlet, further preferably it is a component of the gas supply unit. By the provision of a flooding unit, it is possible to quickly refill an optics compartment with the gas used during the operation of the additive manufacturing apparatus during manual adjustment processes in which optical components are repeatedly accessed from outside. Thereby, the time loss is as small as possible and the beam characteristics can be quickly checked after an adjustment.

Particularly when there are several optics compartments each of which is surrounded by an optics compartment housing, the flooding unit must be sufficiently powerful to be able to provide the mentioned volume flow rates simultaneously to all optics compartments connected to it. Alternatively, there is also the possibility that the additive manufacturing apparatus comprises a plurality of flooding units. For example, a dedicated flooding unit can be assigned to each existing optics compartment.

Preferably, the performance of the flooding unit is configured such that the gas atmosphere in an optics compartment, preferably in each optics compartment connected to it, can be restored within 30 s, if at the start of the flooding process the surrounding atmosphere is prevalent there.

Further preferably, the optics compartment housing has at least one access opening, in particular a service opening, through which an optical component can be adjusted while a defined gas atmosphere is maintained in the optics compartment. The presence of a special gas atmosphere in the optics compartment or the process chamber, as the case may be, leads to the fact that when the region inside of the optics compartment or the process chamber is accessed, an aeration must be made and after the end of the access the special gas atmosphere has to be restored again before a manufacturing process can be continued or started. The resulting expenditure of time is particularly disadvantageous when the additive manufacturing apparatus is used in a series production as the expenditure of time makes the unproductive downtime of the device longer. The idea of the present invention here is to provide access openings in the optics compartment housing and the process chamber wall, respectively, which allow an access from outside to components in the optics compartment through which the gas streams and the process chamber through the gas streams, respectively. In particular, this can be implemented when the pressure inside of the optics compartment housing and the process chamber, respectively, is larger than the surrounding pressure. Particularly when the beam path shall be optimized by an adjustment of the optical components, the existence of service openings results in an enormous saving of time for the adjustment. In general, it is considered to be acceptable when in spite of the existing access opening(s) the parameters of the defined gas atmosphere (meaning the relative humidity, the pressure, the gas composition, etc.) do change by less than 10%.

Further preferably, one of the number of optical components is a laser power modification device, preferably an acousto-optic or electro-optic modulator, which can be adjusted manually from outside of the optics compartment housing via the service opening. The acousto-optic modulator (AOM) can be used for adjusting the beam power, in particular when using a carbon monoxide laser. Here, by an appropriate control, the laser beam is diffracted in the AOM and only the zeroth order of the diffraction pattern is passed through (the use of the first order would also be possible though in that case there will be losses as not the total radiation can be diffracted). Thereby it is possible to quickly reduce the power in the beam to negligible values which makes a quick control in the scanning of the regions of a building material layer to be solidified possible.

Further preferably, one of the number of optical components is a focusing unit that can be manually adjusted from outside of the optics compartment housing through the service opening. The term "focusing unit" here is used representatively for optical components that either individually or in combination do re-shape the laser beam or the laser ray bundle, meaning in particular collimate it, expand it or focus it.

Further preferably, at least one access opening is a measurement opening through which a sensing element or a supply line of a sensing element that is arranged in the optics compartment can be inserted into the optics compartment while maintaining the defined gas atmosphere.

The sensing elements may be sensors that are permanently arranged inside of the optics compartment and, as the case may be, the process chamber, however, do have to be removed from time to time for maintenance purposes. On the other hand, the mentioned sensing elements may also be sensors that are inserted into the optics compartment and, as the case may be, the process chamber only for some time, for example in order to check some operating parameters after the occurrence of irregularities. Only by way of example, the sensors may be temperature sensors, humidity sensors or flow rate sensors.

Here, the term "supply line" does not only refer to lines that supply the sensors with energy (e.g. power supply lines), but also refers to signal lines needed by the sensors for outputting measurement results and/or for receiving drive signals.

Further preferably, the sensing element is able to measure a radiant flux of the laser radiation emitted by the laser light source. The radiant flux in the laser beam can provide valuable information on deviations from the desired state. In order to measure the same, a corresponding sensor is inserted into the beam path. However, this can only be made when there is no ongoing scanning process of a building material layer. Therefore, it is advantageous to bring the corresponding sensor from outside through a measurement opening into the optics compartment, when it is needed.

Further preferably, the access opening is reversibly closable. As in an open state gas will flow to the outside through the access opening, it is advantageous to design the access opening such that it can be opened when necessary and closed again after the access to the inside of the optics compartment or the process chamber. In particular, a spring mechanism can be provided, where for accesses an access opening is kept in an open state against an elastic force.

Further preferably, a cover, by which an access opening is closed, is provided with a seal that guarantees gas density in a closed state, e.g. a seal made from an elastic material.

Further preferably, the access opening has a maximum diameter that is smaller than 12 mm, preferably smaller than 10 mm, and/or a minimum diameter that is larger than 5 mm, preferably larger than 8 mm. In order to avoid the situation that too much gas escapes, a maximum diameter of the service openings and/or measurement openings should be smaller than 12 mm, preferably smaller than 10 mm. However, at the same time the openings should also have a minimum diameter in order not to make an access from outside to components in the optics compartment through which the gas flows and/or the process chamber through which the gas flows not unnecessarily difficult or in order not to restrict too much the diameter of the sensing elements to be inserted. A minimum diameter of the openings thus should be larger than 5 mm, preferably larger than 8 mm.

Preferably, the additive manufacturing apparatus is configured to manufacture a three-dimensional object from a plastic-based powder as building material, wherein the laser radiation emitted by the laser light source in its designated operation is able to effect a solidification of a plastic-based powder as building material. "Plastic-based" here means that the weight percentage of the plastic is larger than 50%.

BRIEF DESCRIPTION OF THE DRAWINGS

Further features and practicalities of the invention will arise from the description of embodiments based on the attached drawings.

DETAILED DESCRIPTION OF THE EMBODIMENTS

Figure 1:
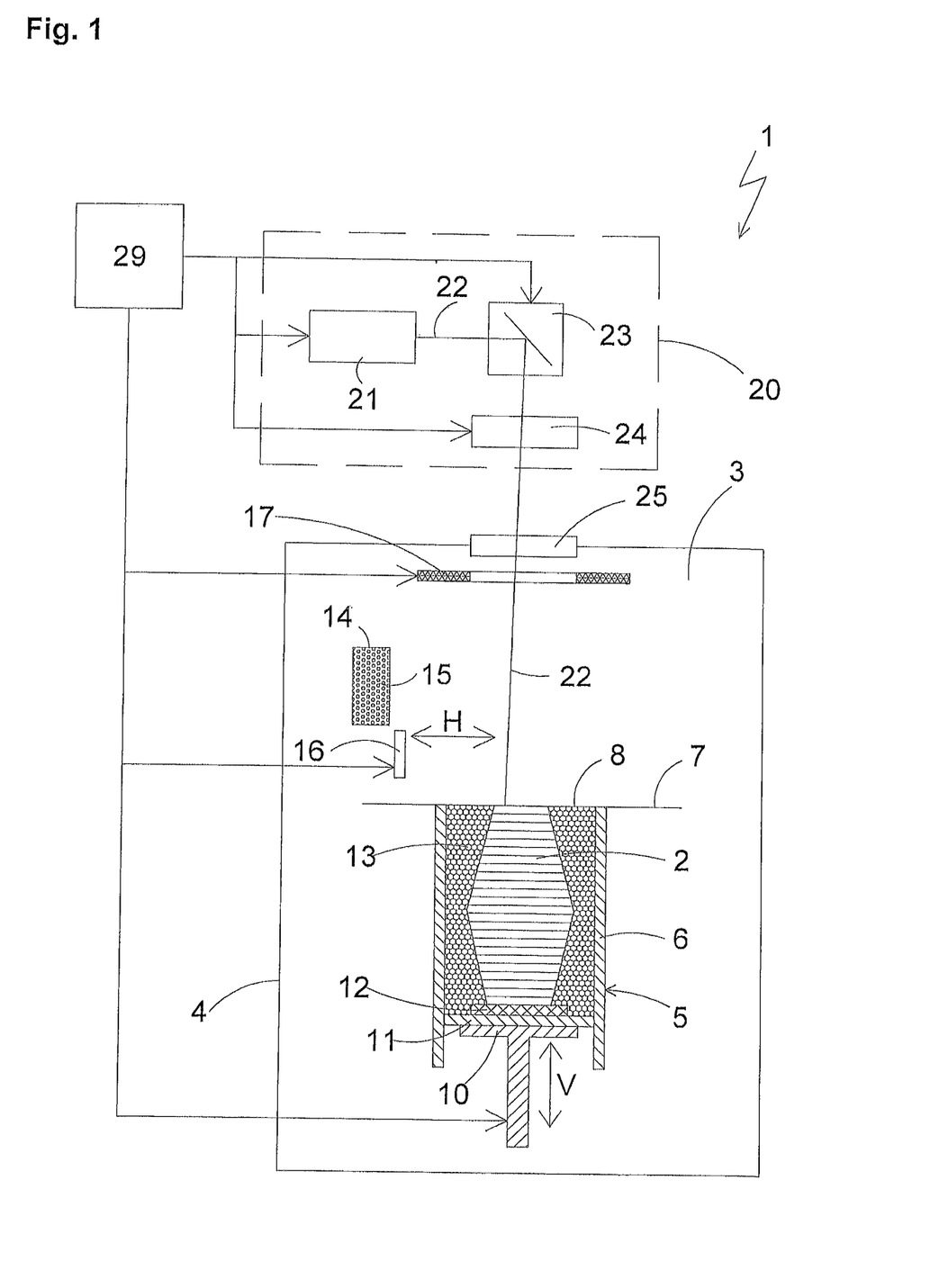
FIG. 1 shows a schematic, partially sectional view of an exemplary additive manufacturing apparatus according to an embodiment of the invention.

For a description of the invention, in the following at first an inventive additive manufacturing apparatus shall be described with reference to FIG. 1 using the example of a laser sintering or melting apparatus.

For building an object 2, the laser sintering or laser melting apparatus 1 comprises a process chamber or build chamber 3 having a chamber wall 4. A build container 5 which is open at the top and which has a container wall 6 is arranged in the process chamber 3. The top opening of the build container 5 defines a working plane 7, wherein the region of the working plane 7 located within the opening, which region can be used for building the object 2, is referred to as build area 8.

In the build container 5, a support 10 is arranged which can be moved in a vertical direction V. To the support 10 a base plate is attached which seals the container 5 at the bottom and thus forms the bottom thereof. The base plate can be a plate that has been formed separately from the support 10, which plate is fixed to the support 10, or it can be formed integrally with the support 10. Depending on the powder and process used, a building platform 11 can be arranged on the base plate, on which building platform the object 2 is built. However, the object 2 can also be built on the base plate itself, which then serves as a building platform. In FIG. 1, the object 2 to be formed in the build container 5 on the building platform 11 is shown below the working plane 7 that is defined by the top edge of the container 5 in an intermediate state with several solidified layers, surrounded by building material 13 that remained unsolidified.

The laser sintering or melting device 1 further comprises a storage container 14 for a building material 15, in this example a powder that can be solidified by electromagnetic radiation, and a recoater 16 as material application device that can be moved in a horizontal direction H for a layer-wise application of the building material 15 within the build area 8. Optionally, a heating device, e.g. a radiant heater 17, can be arranged in the process chamber 3, which heating device serves for a heating of the applied building material. For example, an infrared heater may be provided as radiant heater 17.

The exemplary additive manufacturing apparatus 1 further comprises an energy providing unit 20 having a laser source 21 generating a laser beam 22 and an optics section having a scanner unit 23 and a focusing unit 24. The laser beam is directed onto the working plane 10 through a radiation entrance window 25 that is arranged at the top side of the process chamber 3 in wall of the same. The radiation entrance window comprises for example an fθ lens.

In laser sintering or laser melting, an energy input unit can comprise for example one or more gas or solid-state lasers or any other laser types such as laser diodes, in particular VCSEL (Vertical Cavity Surface Emitting Laser) or VECSEL (Vertical External Cavity Surface Emitting Laser) or a line of the mentioned lasers. Therefore, the specific setup of a laser sintering or melting device shown in FIG. 1 is only exemplary for the present invention and can of course also be modified. In particular, the laser source can also be a carbon monoxide laser such as the one that is sold by the company Coherent under the designation "DIAMOND J-3-5 CO Laser".

Furthermore, the laser sintering apparatus 1 comprises a control unit 29 by which the individual components of the apparatus 1 can be controlled in a coordinated manner in order to implement the building process. The control unit can comprise a CPU, the operation of which is controlled by a computer program (software). The computer program can be stored separately from the apparatus on a storage device from where it can be loaded into the apparatus, in particular into the control unit.

In operation, for applying a powder layer, at first the support 10 is lowered by a distance that corresponds to the desired layer thickness. Then, by moving the recoater 14 across the working plane 7, a layer of the building material 15 in powder form is applied. It is applied at least across the total cross-section of the object 2 to be manufactured, preferably in the entire construction field meaning that region of the working plane 7 that lies inside of the top opening of the container 5. Subsequently, the cross-section of the object 2 to be manufactured is scanned with the laser beam 22 so that the building material in powder form is solidified at those positions that correspond to the cross-section of the object 2 to be manufactured. These steps are repeated until the object 2 is finished and can be taken out of the process chamber 3.

Figure 2:
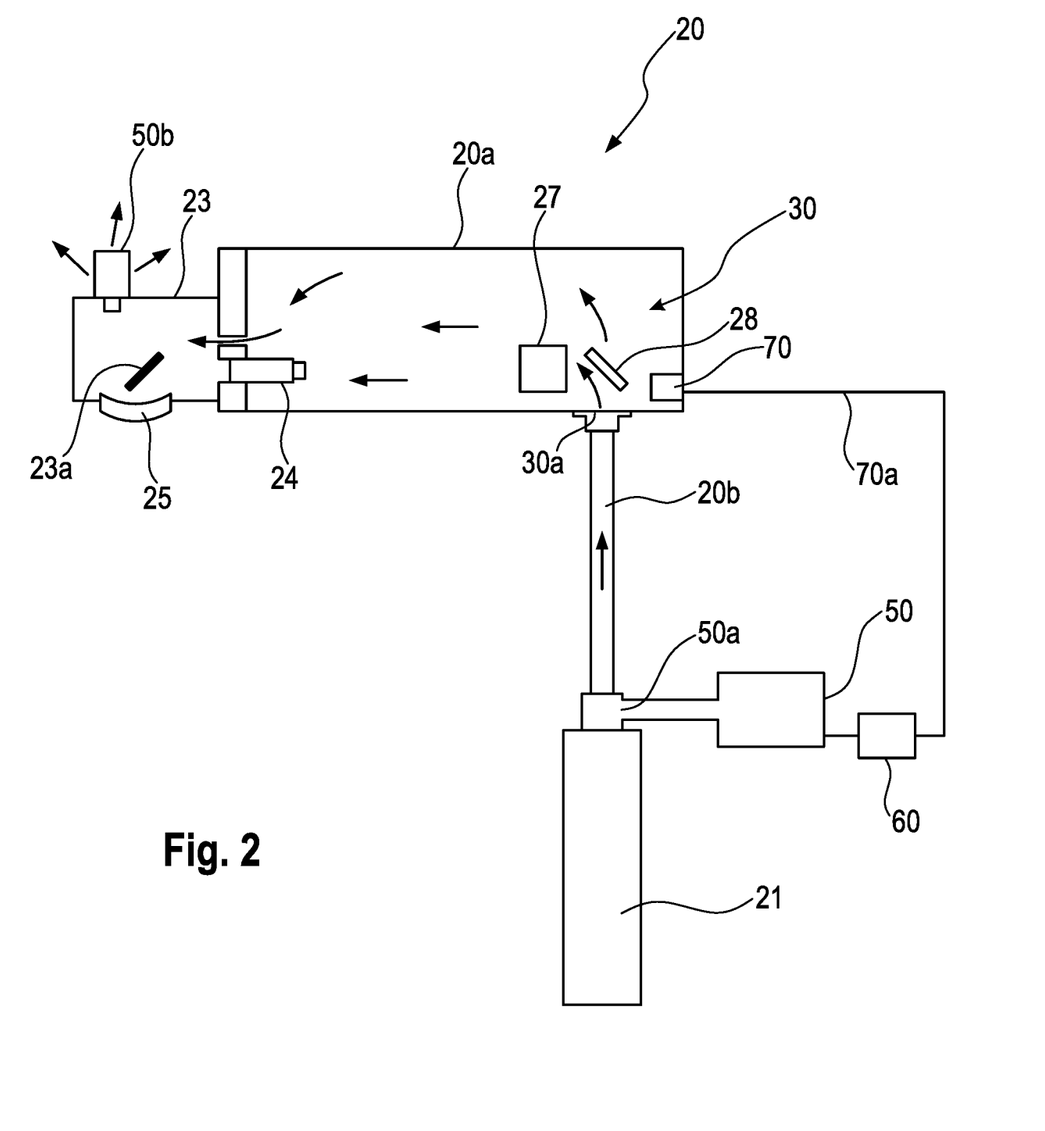
FIG. 2 schematically shows a detail of the additive manufacturing apparatus of FIG. 1.

FIG. 2 schematically shows an example of an inventive embodiment of the radiation provision unit 20 of the additive manufacturing apparatus 1. In contrast to FIG. 1, the positions of the scanner unit 23 and of the focusing unit 24 in the beam path have been exchanged. In detail, the optic section in FIG. 2 consists of a beam adjustment unit 30 including a focusing unit 24 and of the scanner unit 23. When the laser beam is switched on, it initially proceeds from the exit of the laser 21 to the entrance 30a of the beam adjustment unit 30. In the beam adjustment unit 30, it is deflected by means of a deflection mirror 28 that directs the beam to the focusing unit 24. From the focusing unit 24 the beam impinges on merely schematically shown deflection mirrors 23a of the scanner unit 23 in order to be directed by the same through the beam entrance window 25 onto the surface of a building material layer to be solidified that is not shown.

It shall be emphasized that the geometric position of the optical components may also be changed as and when required. For example, one could completely forego the deflection mirror 28 by arranging the components such that the beam path between the laser 21 and the focusing unit 24 is straight. However, it is also possible that still other beam deflection components are introduced into the beam path without any deviation from the idea of the invention.

Furthermore, the focusing unit 24 may consist of one or more components and may include without any claim to completeness a beam expanding unit, a collimation unit and focusing lenses in one or more copies. Also, the beam adjustment unit 30 may include still further optical components. For example, in FIG. 2 an optional laser power modification device 27 is shown, which in the present example is an acousto-optic modulator (AOM). The AOM may be used for adjusting the power of the beam, in particular when using a carbon monoxide laser.

Finally, it shall be emphasized again that, where possible, components in the beam path may be also exchanged with each other, for example by integrating the scanner unit 23 into the beam adjustment unit 30 and/or by exchanging the positions in the beam path of the scanner unit 23 and of the focusing unit 24. In the latter case, it is also possible to outsource the focusing unit 24 from the beam adjustment unit 30 instead of an outsourcing of the scanner unit 23.

All components of the optics section are surrounded by an optics compartment housing which provides for a substantially hermetical shielding of the components of the optics section against the surrounding atmosphere. In the following, the room inside of the optics compartment housing will be referred to as optics compartment. In the example of FIG.

2, the optics compartment housing comprises the wall of the scanner unit 23 and the wall 20a of the beam adjustment unit 30 which has a gas tight connection thereto. It has a gas tight connection to the laser beam housing 20b which is a gas tight envelopment of the laser beam 22 that has a gas tight connection to the exit of the laser 21 as well as to the wall 20a of the beam adjustment unit 30.

Furthermore, a gas supply unit 50 can be seen in FIG. 2, which supplies a gas stream to the inside of the optics compartment housing. In FIG. 2, the gas inlet 50a is at the exit of the laser 21 and the gas outlet 50b is in the wall of the scanner unit 23. The gas supply unit is a drive means for moving a volume of gas, meaning e.g. a pump or a fan. In FIG. 2, the route of the gas between the gas inlet 50a and the gas outlet 50b is schematically illustrated by arrows. In particular, an opening for the gas stream in the common wall or parting wall between the beam adjustment unit 30 and the scanner unit 23 can be seen.

The gas supply unit 50 sets the gas flow rate through the optics compartment to a value, which lies between 2 l/min and 15 l/min and is preferably larger than or equal to 5 l/min and/or smaller than or equal to 8 l/min. Optionally, a flooding unit (not shown) may be present by means of which the optics compartment can quickly be refilled again with the gas used during the operation of the additive manufacturing apparatus after a service in order to loose as few time as possible and to be able to continue or newly start a manufacturing process. Preferably, the flooding unit is arranged at the gas inlet, further preferably it is a component of the gas supply unit. Preferably, the flooding unit is able to provide for a supply of gas with a volume flow rate that is larger than 50 l/min, preferably larger than 80 l/min and/or smaller than 120 l/min, preferably smaller than 150 l/min. The specified values are related to standard conditions meaning according to DIN 1343 a temperature of 273.15° K and a pressure of 101.325 k/Pa.

A humidity control unit adjusts the relative humidity of the gas flowing through the optics compartment such that it is as small as possible, however, such that in any case the relative humidity is below 1%, preferably below 0.5%. Here, for example, a percentage of dry gas that is continuously added to the gas stream can be adjusted in that the humidity control unit comprises a dry gas supply control unit 60. Alternatively or in addition, the humidity control unit may comprise a control unit (not shown) for the drying capacity of a de-humidifier not shown in FIG. 2. The latter may be arranged at an arbitrary position, thus at the gas inlet 50a or in the optics compartment or else outside of, in particular apart from, the additive manufacturing apparatus. It shall additionally be remarked that the position of the humidity control unit 60 in FIG. 2 is only by way of example and that the humidity control unit 60 may also be arranged at a different position.

Preferably, the humidity control unit 60 performs an active control of the humidity content of the gas. For this, at least one humidity sensor is arranged in the optics compartment. By way of example, in FIG. 2 the humidity sensor 70 is located in the beam adjustment unit 30. Depending on the signals or values outputted by the humidity sensor 70 via the connection line 70a to the humidity control unit 60, the humidity control unit 60 then regulates the humidity content to a desired predetermined value. By arranging a plurality of humidity sensors 70 in the optics compartment, it is possible to remedy the problem that due to an insufficient streaming of the gas through the optics compartment at some positions there will be a higher humidity content than at other positions. The humidity control unit 60 then can for example adjust the humidity content of the gas based on the highest one of the measurement values for the humidity that are outputted by the individual humidity sensors.

Even when the optics compartment is preferably hermetically or in a gas-tight way delimited against the process chamber 3, in a modified apparatus provision can be made that the same gas flows through the optics compartment and the process chamber, meaning that in the optics compartment and in the process chamber a nearly identical gas atmosphere is established. Then, the humidity content of the gas atmosphere is limited by the humidity control unit 60 in particular also in the process chamber 3. Preferably, at least one humidity sensor 70 can be arranged for this also in the process chamber 3.

Though FIG. 2 in fact is a schematic representation, FIG. 2 nevertheless shows a preferred mounting orientation of the laser light source 21: Assuming that the vertical in FIG. 2 (meaning the vertical of the drawing sheet) is identical to the vertical in an installation situation at an additive manufacturing apparatus, it can be seen that the laser light exits the laser light source 21 upwards (meaning in a direction against the force of gravity). Due to the arrangement of the gas inlet 50a at the exit of the laser light source 21, the supplied gas flows through the laser beam housing 20b into the optics compartment housing 20a also in a direction against the force of gravity. This is advantageous as thereby the laser light exit window (not designated) at the exit of the laser light source 21 can be automatically kept free from dirt, which otherwise would be able to accumulate thereon. It is clear that the advantage of this solution can already be obtained when the laser light exits the laser light source under an angle against the direction opposite to the force of gravity, e.g. under an angle which is smaller than or equal to 45°, preferably smaller than or equal to 30°.

Dirt can in particular be kept away from the laser light exit window of the laser light source 21, if the gas at the gas inlet 50a gains a horizontal component of movement that leads to a helical upward movement of the gas stream inside of the laser beam housing 20b.

Due to the presence of a special gas atmosphere in the optics compartment and/or the process chamber, an aeration has to be carried out when the area inside of the optics compartment or the process chamber is accessed and after the end of the access the special gas atmosphere has to be restored again before a manufacturing process can be continued or started. The expenditure of time resulting from that is particularly disadvantageous when using the additive manufacturing apparatus in a series production as the expenditure of time increases the unproductive idle time of the apparatus. The idea of the present invention here is that service openings are provided in the optics compartment housing and/or the process chamber wall, which service openings have only a small diameter and allow an access from outside to components in the optics compartment through which the gas streams and/or to the process chamber through which the gas streams. Alternatively or in addition, measurement openings may be provided, which have only a small diameter and allow the insertion of sensing elements from outside into the optics compartment through which the gas streams and/or the process chamber through which the gas streams.

In the following, individual examples for inventive service and measurement openings will be explained based on FIGS. 3 to 5, wherein the list of examples is not meant to be exhaustive and where there exist numerous further possibilities of using service and measurement openings.

Figure 3:
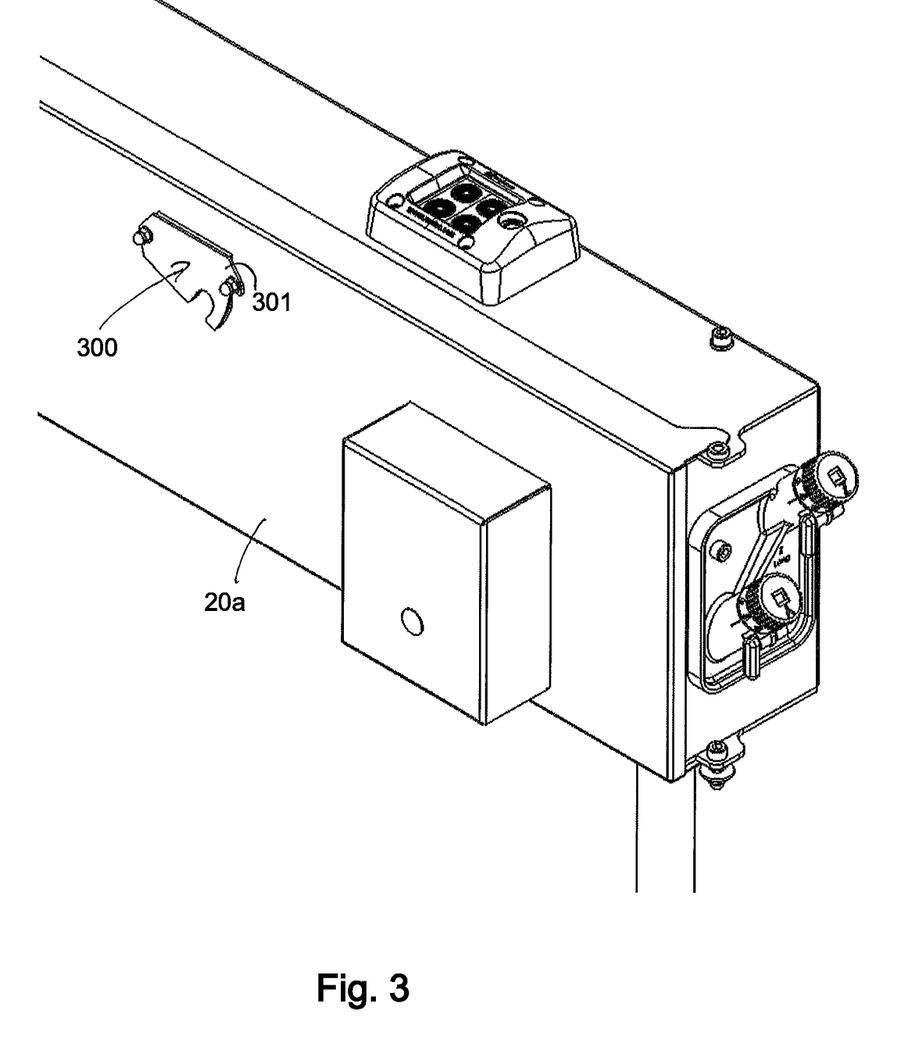
FIG. 3 shows a schematic view of an optics compartment housing having a measurement opening for carrying out measurements in the optics compartment.

FIG. 3 shows a view of an optics compartment housing 20a in which a measurement opening 300 can be recognized that in the representation is covered by a cover 310. Thus, FIG. 3 shows the measurement opening 300 in a state in which it is closed as it is not used. Here, the closing mechanism can be implemented by means of a spring mechanism that is not shown. For example, a feed cable of a sensor or sensing element that has been inserted into the inside of the optics compartment housing may be led through the measurement opening 300 in order to transmit signals from inside of the optics compartment to the outside or from outside of the optics compartment to the inside during the measurement. The sensing element may in particular be one that is able to detect a radiant flux in the laser beam in the optics compartment.

Due to the use of measurement openings it is generally possible to insert sensing elements during the ongoing operation of the additive manufacturing apparatus, for example in order to check whether operation parameters are leaving the admissible range of values or, when irregularities in the manufacturing process are detected, in order to be able to explore the causes of the same without having to interrupt the manufacturing process.

Preferably, the measurement openings 300 will be arranged such that sensing elements can be steered to particularly appropriate positions inside of the optics compartment and the process chamber 3, respectively.

Figure 4:
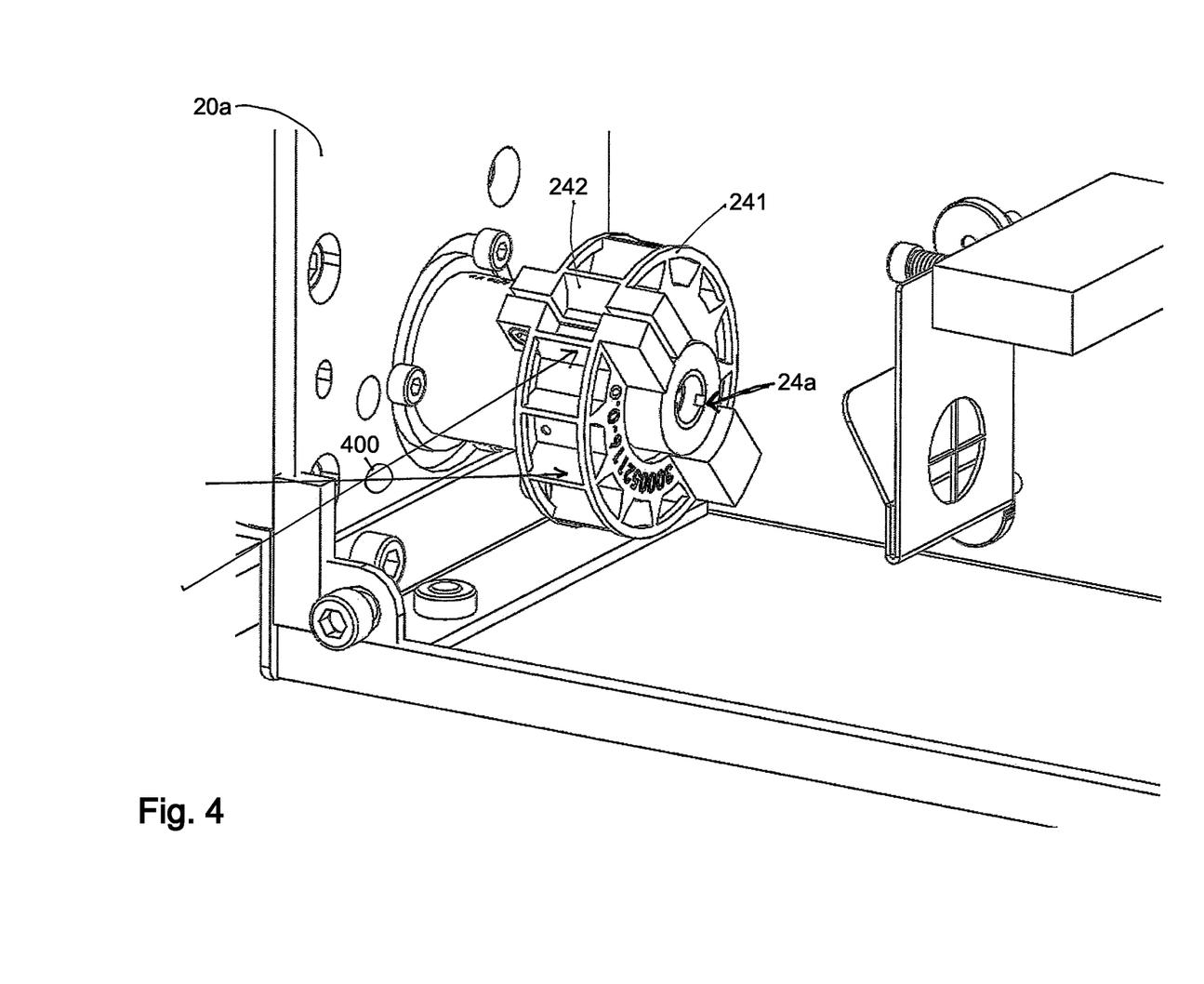
FIG. 4 shows a schematic view of an optics compartment housing having a service opening for adjusting a beam expander which is a component of a focusing unit.

FIG. 4 shows a service opening 400 which allows to carry out manipulations at a beam expander 24a. For this, the service opening 400 is arranged in the transparently drawn optics compartment housing 20a such that therethrough the beam expander 24a can be reached with a rod-shaped instrument. An access from outside of the optics compartment housing to different positions of the beam expander 24a is illustrated by means of two arrows.

Also on the side of the unit that shall be manipulated from outside, in this example the beam expander 24a, provisions can be made that make a handling or adjustability from outside of the optics compartment housing 20a easier. Thus, the beam expander in FIG. 4 has a collar 241, which in the figure surrounds the beam expander like a ring and has at its outer face recesses 242, which can be engaged by a rod-shaped instrument. Then, by exerting pressure to the sidewalls of the recesses, a movement, in particular a rotation of one or more beam expander elements about an axis for adjusting the beam expansion, can be induced.

Figure 5:
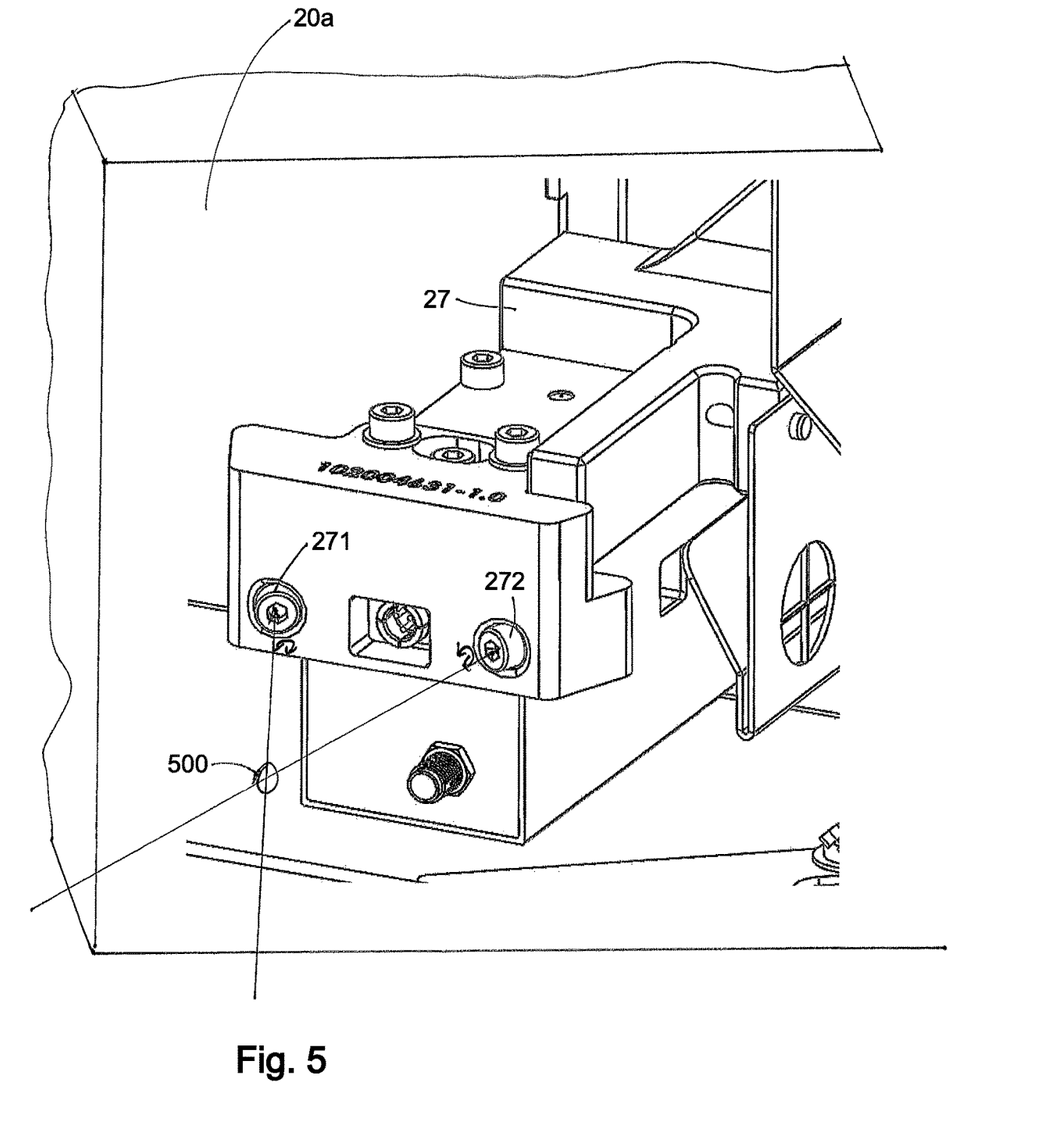
FIG. 5 shows a schematic view of an optics compartment housing having a service opening for adjusting an acousto-optic modulator that is used for modifying the power in the beam.

FIG. 5 shows a case in which a laser power modification device 27 is located in the optics compartment. As for the other optical components, also for the laser power modification device 27 an optical adjustment must be made in order to optimize the beam path for a focusing of the radiation onto the construction plane or working plane. Accordingly, in FIG. 5 a service opening 500 in the optics compartment housing 20a is arranged near to the two adjustment elements 271 and 272 of the laser power modification device 27. Thereby both adjustment elements 271 and 272 can be operated through the service opening 500 by means of a rod-shaped instrument. This is illustrated in the figure by two arrows. Even when the correction of the beam path is carried out not immediately during an exposure process of building material in the process chamber, the presence of the service opening 500 is nevertheless of advantage. In order to assess the effects of changes at the laser power modification device 27, the radiant flux in the laser beam must be measured, which has to be made in a dry gas atmosphere. On the one hand, more exact measurement results are obtained by that, on the other hand it will save an "aeration" with a following re-establishment of the gas atmosphere for each adjustment process.

Of course, to each adjustment element there could be assigned a dedicated service opening. However, by an appropriate positioning and orientation of the adjustment elements of an optical component, it is generally possible to save service openings in that different adjustment elements can be operated through one service opening, which different adjustment elements may definitely belong also to different optical components.

In FIG. 5, the adjustment elements 271 and 272 are screws having a hexagonal recess at the screw head. By an engagement into the hexagonal recesses and by a rotation of the screws about their axes, the position of the laser power modification device 27 in the beam path can be adjusted. It goes without saying that alternatively to a hexagonal recess also any other screw head profile known in the prior art can be operated from outside in this way, for example a cross recess, an outer hexagon socket, a Torx profile, etc.

The invention claimed is:

1. An additive manufacturing method for manufacturing a three-dimensional object in an additive manufacturing apparatus by a layer-wise selective solidification of building material by laser radiation, comprising:
   repeatedly applying a layer of the building material on a previously selectively solidified building material layer in a process chamber;
   scanning positions corresponding to the cross-section of the three-dimensional object in the layer with laser radiation;
   generating the laser radiation with a laser light source emitting light in a wavelength of about 5.5 μm, the laser light source having a first beam path that is confined within a beam path conduit and is directed via a number of optical components to a beam entrance window formed in a wall of the process chamber;
   providing an optics compartment that is encased by an optics compartment housing within which the optical components are contained, the laser radiation having a second beam path confined within the optics compartment;
   providing a defined gas atmosphere that is maintained inside of the optics compartment and inside of the beam path conduit, the beam path conduit communicating with the optics compartment through a beam transparent window such that the beam path conduit and optics compartment comprise separate enclosed chambers,
   wherein the second beam path extends within a range of 0.5 meters to 1.5 meters, and the relative humidity of the defined gas atmosphere is dependent on a length of the second beam path and is maintained at a range of 3% or less to 1.5% or less as the length of the second beam path increases from 0.5 meters to 1.5 meters.

2. The additive manufacturing method of claim 1, wherein the relative humidity of the defined gas atmosphere inside of the optics compartment housing is maintained below 1%.

3. The additive manufacturing method of claim 1, wherein a defined process chamber gas atmosphere is maintained in the process chamber and the relative humidity of the process chamber gas atmosphere is maintained below 3%.

4. The additive manufacturing method of claim 1, further comprising leading the laser radiation inside of the defined gas atmosphere along its entire beam path outside of optical components from an exit of the laser light source to a beam entrance window through which the radiation enters the process chamber.

5. The additive manufacturing method of claim 1, wherein the relative humidity of the defined gas atmosphere is feedback-controlled using at least one measurement value characterizing the relative humidity of the defined gas atmosphere, the measurement value being output by at least one humidity sensor arranged in the optics compartment, for feedback-controlling the relative humidity of the defined gas atmosphere.

6. The additive manufacturing method of claim 1, wherein the defined gas atmosphere in the optics compartment is maintained by supplying a gas with a volume flow rate that is larger than or equal to 2 l/min and/or smaller than or equal to 15 l/min.

7. The additive manufacturing method of claim 1, wherein the defined gas atmosphere in the optics compartment is established by flooding the optics compartment with a volume flow rate that is larger than 50 l/min.

8. The additive manufacturing method of claim 1, wherein a plastic-based powder is used as the building material.

9. An additive manufacturing apparatus for manufacturing a three-dimensional object by a layer-wise selective solidification of building material by laser radiation, comprising:
  a process chamber, in which a layer of building material can be repeatedly applied on a previously selectively solidified building material layer and which can be scanned with the laser radiation at positions corresponding to the cross-section of the object in the layer;
  a laser light source emitting light in a wavelength of about 5.5 µm for generating the laser radiation, the laser light source having a first beam path that is confined within a beam path conduit;
  a number of optical components for directing the laser radiation onto the building material layer to a beam entrance window formed in a wall of the process chamber, wherein the number of optical components is arranged in an optics compartment that is encased by an optics compartment housing, which is configured to maintain a defined gas atmosphere in the optics compartment, the first beam path conduit communicating through an opening into the optics compartment such that the laser radiation proceeds along the first beam path and along a second beam path confined within the optics compartment;
  a source of defined gas atmosphere supplied to the conduit and communicating through the opening into the optics compartment, and through and out a gas atmosphere exit port from the optics compartment; and
  a humidity control unit that maintains the relative humidity of the defined gas atmosphere inside of the optics compartment housing,
  wherein the second beam path extends within a range of 0.5 meters to 1.5 meters, and the humidity control maintains the defined gas atmosphere dependent on a length of the second beam path within a range of 3% or less to 1.5% or less as the length of the second beam path increases from 0.5 meters to 1.5 meters, during the operation of the additive manufacturing apparatus.

10. The additive manufacturing apparatus of claim 9, wherein the optics compartment is separated from the process chamber by a radiation entrance window formed in a common wall between the process chamber and the optics compartment.

11. The additive manufacturing apparatus of claim 9, wherein the laser light source is arranged outside of the optics compartment housing and is connected to the optics compartment housing via a beam path conduit, wherein the beam path conduit is configured to maintain a defined gas atmosphere and is designed such that laser radiation can be directed from the laser light source through the beam path conduit into the optics compartment housing.

12. The additive manufacturing apparatus of claim 9, wherein the laser light source is a CO laser.

13. The additive manufacturing apparatus of claim 9, further comprising at least one humidity sensor arranged in the optics compartment.

14. The additive manufacturing apparatus of claim 9, further comprising a flooding device that when activated enables a feeding of gas into an optics compartment housing with a volume flow rate that is larger than 50 l/min.

15. The additive manufacturing apparatus of claim 9, wherein the optics compartment housing includes at least one access opening through which an optical component can be adjusted while a defined gas atmosphere is maintained in the optics compartment.

16. The additive manufacturing apparatus of claim 15, wherein one of the number of optical components is a laser power modification device that can be adjusted manually from outside of the optics compartment housing via the access opening.

17. The additive manufacturing apparatus of claim 15, wherein the access opening is reversibly closable.

18. The additive manufacturing apparatus of claim 15, wherein the access opening has a maximum diameter less than 12 mm.

19. An additive manufacturing method for manufacturing a three-dimensional object in an additive manufacturing apparatus by a layer-wise selective solidification of building material by laser radiation, comprising:
  repeatedly applying a layer of the building material on a previously selectively solidified building material layer in a process chamber;
  scanning positions corresponding to the cross-section of the three-dimensional object in the layer with laser radiation;
  generating the laser radiation with a laser light source emitting light in a wavelength of about 5.5 µm, the laser light source having a first beam path that is confined within a beam path conduit and is directed via a number of optical components to a beam entrance window formed in a wall of the process chamber;
  providing an optics compartment that is encased by an optics compartment housing within which the optical components are contained, the laser radiation having a second beam path confined within the optics compartment;
  providing a defined gas atmosphere that is maintained inside of the optics compartment and inside of the beam path conduit, the beam path conduit communicating with the optics compartment through an opening,
  wherein the second beam path extends within a range of 0.5 meters to 1.5 meters, and the relative humidity of the defined gas atmosphere is dependent on a length of the second beam path and is maintained at a range of 3% or less to 1.5% or less as the length of the second beam path increases from 0.5 meters to 1.5 meters.

* * * * *